(12) United States Patent
Harris et al.

(10) Patent No.: US 7,121,716 B2
(45) Date of Patent: Oct. 17, 2006

(54) MIXING EQUIPMENT SEALING DEVICE

(75) Inventors: Marlon D. Harris, Christiansburg, VA (US); Daniel Talbert, Jr., Pulaski, VA (US); Edward D. Burnett, Galax, VA (US)

(73) Assignee: Alliant Techsystems Inc., Edina, MN (US)

( * ) Notice: Subject to any disclaimer, the term of this patent is extended or adjusted under 35 U.S.C. 154(b) by 329 days.

(21) Appl. No.: 10/813,180

(22) Filed: Mar. 30, 2004

(65) Prior Publication Data

US 2005/0242520 A1    Nov. 3, 2005

(51) Int. Cl.
*B01F 15/00*    (2006.01)
*F16J 15/54*    (2006.01)

(52) U.S. Cl. .................. 366/331; 277/511; 277/559

(58) Field of Classification Search ............ 366/64–67, 366/79, 83–85, 96–99, 318, 331, 608; 416/174; 277/500, 511, 559
See application file for complete search history.

(56) References Cited

U.S. PATENT DOCUMENTS

| | | | | | |
|---|---|---|---|---|---|
| 3,313,550 | A | * | 4/1967 | Culman | 277/511 |
| 3,887,169 | A | * | 6/1975 | Maynard | 366/307 |
| 3,921,962 | A | * | 11/1975 | Feger et al. | 366/64 |
| 4,109,920 | A | * | 8/1978 | Wiese | 277/408 |
| 4,177,227 | A | | 12/1979 | Harvey et al. | |
| 4,412,747 | A | | 11/1983 | Moriyama | |
| 4,419,015 | A | * | 12/1983 | Liddiard | 366/349 |
| 4,568,092 | A | * | 2/1986 | Hayashida et al. | 277/559 |
| 4,850,723 | A | * | 7/1989 | Whiteman, Jr. | 384/477 |
| 4,858,936 | A | | 8/1989 | Adams | |
| 4,878,677 | A | * | 11/1989 | Larkins et al. | 277/511 |
| 5,171,022 | A | * | 12/1992 | Fessmann | |
| 5,228,255 | A | * | 7/1993 | Hahn | 52/396.04 |
| 5,261,740 | A | * | 11/1993 | Mosher et al. | 366/76.9 |
| 5,277,489 | A | * | 1/1994 | Hamm | 366/2 |
| 5,368,390 | A | * | 11/1994 | Gambrill et al. | 366/273 |
| 5,382,089 | A | * | 1/1995 | Mosher | 366/83 |
| 5,526,566 | A | * | 6/1996 | Mosher | 29/889 |
| 5,560,709 | A | * | 10/1996 | Hutchings et al. | 366/331 |
| 5,690,341 | A | * | 11/1997 | Prough et al. | 277/511 |
| 5,700,086 | A | * | 12/1997 | Forslund | 366/172.2 |

(Continued)

FOREIGN PATENT DOCUMENTS

DE    2930514 A1 *    2/1981

(Continued)

*Primary Examiner*—Charles E. Cooley
(74) *Attorney, Agent, or Firm*—Nikolai & Mersereau, P.A.; C. G. Mersereau

(57) ABSTRACT

A shaft sealing arrangement for sealing bores around a pair of stirrer shafts that emerge through a wall of an associated mixing vessel includes a pair of generally cylindrical shaft sealing assemblies designed to be carried on adjacent stirrer shafts, each gland assembly including the gland member and a gland housing. A plurality of raised spaced radially distributed wiper strips are attached to outside surface of each gland which are directionally deployed at an angle with the direction of the axis of the gland such that the wiper strips act to return escaping material back into an associated mixing vessel. The gland assemblies are designed to be mounted on to rotate with a corresponding one of the pair of stirrer shafts and are enabled to move axially relative therealong. A drive system operates the gland assemblies along the shafts between a deployed (mixing) position with each gland positioned in a wall bore through which a corresponding stirrer shaft emerges and in a retracted (cleaning) position wherein said gland assemblies are withdrawn outside the wall.

12 Claims, 7 Drawing Sheets

U.S. PATENT DOCUMENTS

| | | |
|---|---|---|
| 5,712,445 A | 1/1998 | Kassuelke et al. |
| 5,735,603 A * | 4/1998 | Kesig et al. ............... 366/331 |
| 6,071,444 A | 6/2000 | Worrell, Jr. et al. |
| 6,270,247 B1 * | 8/2001 | Tschopp .................... 366/289 |
| 6,390,666 B1 * | 5/2002 | Schafer et al. ............. 366/331 |
| 6,435,515 B1 * | 8/2002 | Galletti ...................... 277/407 |
| 6,523,997 B1 * | 2/2003 | Cotteverte et al. ......... 366/331 |
| 6,616,326 B1 * | 9/2003 | White ........................ 366/331 |
| 6,871,858 B1 * | 3/2005 | Futai .......................... 277/500 |
| 6,935,771 B1 * | 8/2005 | Engel ......................... 366/331 |
| 2002/0057626 A1 * | 5/2002 | Schafer et al. ............. 366/331 |
| 2005/0135187 A1 * | 6/2005 | Essing et al. .............. 366/331 |
| 2005/0180259 A1 * | 8/2005 | Crall et al. ................. 366/331 |

FOREIGN PATENT DOCUMENTS

| | | |
|---|---|---|
| JP | 2000-271466 | * 10/2000 |
| JP | 2000-283297 | * 10/2000 |

* cited by examiner

MIXING EQUIPMENT SEALING DEVICE

BACKGROUND OF THE INVENTION

I. Field of the Invention

The present invention relates generally to a sealing device for use in industrial mixing or blending equipment of a class which includes one or more rotary mixing blades having long shafts extending into a large mixing bowl in which viscous liquids, particularly explosive propellant materials, are mixed. More particularly, the present invention provides such a mixer with a retractable mixing blade shaft sealing gland system that can be withdrawn and cleaned and reset between mix cycles and which, in addition, minimizes the clearance between the gland and the mixer bowl thereby reducing the material lost during the mix cycle and improving batch-to-batch solvent content consistency, particularly in high-solvent mixes II. Related Art Mixers and blenders for homogenizing hazardous materials such as propellant materials presently use outboard bearings spaced from the mixing bowl as supports for rotating shafts of mixing blades to segregate areas where mechanical friction is present from areas where the propellant is present inside the mixer bowl during normal operation. Sealing the interface between the stirring shafts and the base openings where the rotating shafts emerge from the bowl has always been difficult. The mixers are generally modified versions of equipment that has been used in the baking industry where sealing has also been a problem. This has led to the development of sealing systems of various kinds. One such system as applied to a dough kneading device is illustrated and described in U.S. Pat. No. 4,412,747. Another type of shaft sealing device is shown in U.S. Pat. No. 4,858,936.

Owing to the hazardous mixture of the material, propellant mixers have had to be adapted to function safely in an environment involving different unique concerns. The standard practice for sealing stirring shafts in the propellant/explosives industry had been to tightly seal the gland area using a flax/felt packing material. However, these gland areas tended to become contaminated by propellant fines and subsequent solvent loss and viscous heating caused drying of the propellant fines and this, in turn, increased the danger of ignition and subsequent propellant fires in the mixing operation.

More recently, the practice has been to fully open the gland area by removing the packing material and allowing migrating product to flow freely through a fixed gap in the gland area into a catch pan beneath the stirring shaft attempting to keep losses to a minimum. A gland assembly drawing illustrating this prior art concept appears in FIG. 1.

FIG. 1 is a fragmentary view of a mixing system showing a prior art gland assembly partially in section. It includes a schematic representation of a mixing bowl-fragment 10. Spaced parallel, oppositely rotated mixing blades 12 and 14 are fixed to and driven respectively by stirrer shafts 15 and 16, which are supported by a bearing plate 18 spaced at a distance from the mixing bowl end plate 20. Stationary sealing glands 22 and 24, respectively, surround the shafts 15 and 16 and are bolted to the mixer end plate 20 as at 26 and 28, respectively. Gaps indicated by 30 are provided and maintained surrounding the mixer shafts between the shafts and the glands. The gaps are left fully open allowing migrating product propelled by the mixing action toward end wall 20 to seep or flow freely through the gaps in the gland area. Product flow force is indicated by arrows 32 and mixing blade rotation is indicated by arrows 34 and 36. A catch pan (not shown) is provided beneath the stirring shafts to catch product that migrates past the glands.

While this has solved some prior problems, it has been found, however, that with mixes of high solvent content, excessive amounts of product can be lost oozing through the glands or, in the worst case, the glands may become packed with material. The resulting friction, of course, can be hazardous. This situation necessitates that the glands (which are assembled from two semicircular halves) be disassembled and cleaned after each mix cycle to minimize the risk of buildup.

In view of the present situation, there exists a definite need for innovative technology with regard to improving shaft sealing gland systems in such mixing devices, both from the standpoint of safety and minimizing down time while preserving the integrity of each mix.

SUMMARY OF THE INVENTION

The present invention solves many of the problems associated with the sealing of stirrer or mixing shafts traversing bores in the walls of large mixing vessels and is particularly suited to mixing involving hazardous (combustible) materials. The concept involves the provision of shaft sealing glands that do not contact the walls of the mixing vessel yet promote redirection of material tending to escape from the mixing vessel back into the mixing vessel. Material is urged back into the mixing vessel, preferably by a series of raised, spaced, radially distributed, angled wiper strips attached to the outside surface of each mixing gland which cooperate with the corresponding direction of shaft rotation during mixing to urge material moved toward the gland gaps by the mixing action back toward the interior of the mixing vessel. The sealing glands are mounted on stirrer shafts with associated housings as gland assemblies which rotate with the shafts being sealed during mixing, but are attached to a mechanized drive system which retracts the gland assemblies for cleaning and maintenance between mixing batches and repositions the glands for the next mixing operation.

In a preferred embodiment, the mixing glands are brass with attached raised wiper strips made of plastic and the gland housings are stainless steel. Both the housings and glands are preferably made in two halves which bolt together using external bolts and which allow the parts to dovetail circumferentially and therefore operate as a unitary structure when rotated or telescoped along the shaft during deployment and retraction. Rotation relative to the shaft is prevented by the provision of drive clamps fixed around the mixing shaft. The drive clamps allow the gland assemblies to move along the stirrer shafts but prevent relative rotation between them. See FIG. 6.

A drive system is provided to move gland/housing combinations (gland assemblies) between a deployed position with the gland located within the wall bore and a retracted position in which the gland assembly is withdrawn outside of the mixer wall. Such a system is described with respect to a pair of mixing shafts such are commonly used in combination in mixers of the class. A mixer typically includes a pair of spaced, generally parallel bladed stirring shafts designed to rotate in opposite directions. As indicated, the shafts are provided with sealing glands with housings that form gland assemblies. The housings of the gland assemblies are provided with circumferential grooves that accommodate a common pusher plate mounted therebetween. The pusher plate is, in turn, operated by a double-acting fluid operated cylinder mounted thereon which moves the pusher plate relative to the mixer vessel wall and with it the gland assemblies which telescope along the stirrer shafts, which are generally perpendicular to the wall or end plate of the mixer, thereby causing the sealing glands to deploy and retract, as desired.

In a preferred embodiment, the rod end of the fluid cylinder is attached as by a clevis joint to a mounting plate that is fixed to the wall of the vessel in a manner such that extension of the cylinder rod causes the cylinder and the pusher plate, which carries with it the gland assemblies, to move away from the vessel wall thereby retracting the gland for cleaning. Conversely, when the cylinder rod is collapsed or retracted back into the cylinder, this causes the pusher plate and with it the gland assemblies to move back toward the wall and into position for mixing. In one embodiment, the cylinder is an air cylinder, however, hydraulic units would work as well.

BRIEF DESCRIPTION OF THE DRAWINGS

In the drawings wherein like reference characters designate like parts throughout the same.

DETAILED DESCRIPTION

The detailed description that follows represents an example of a preferred embodiment of the shaft sealing gland system in accordance with the present invention which is not meant to limit the scope of the invention in any manner but only to illustrate an example of the concept. The shaft sealing gland system of the invention is characterized by shaft sealing glands that rotate with the mixing shafts during the mixing operation but which retract away from the mixing vessel for easy cleaning between mixing batches. The mixing glands include wiper strips or similar devices to encourage retention or return of material attempting to migrate out to the mixing vessel. This combination prevents material build-up and reduces material losses through the gap between the gland and the mixing vessel wall or end plate. A mechanized system is provided for retracting the gland assembly away from the mixer end plate between mix batches for easy cleaning.

Figure 1:
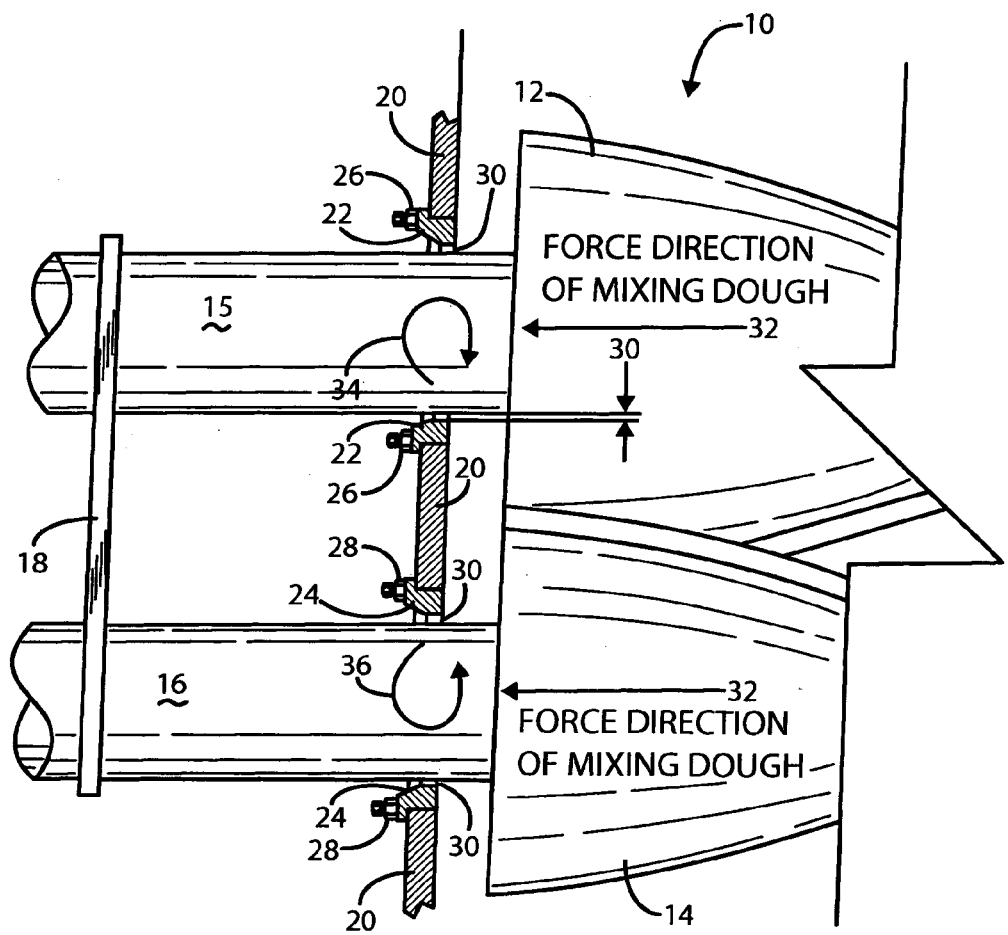
FIG. 1 is a fragmentary schematic view partially in section showing a prior art mixer shaft sealing gland system.
Figure 2:
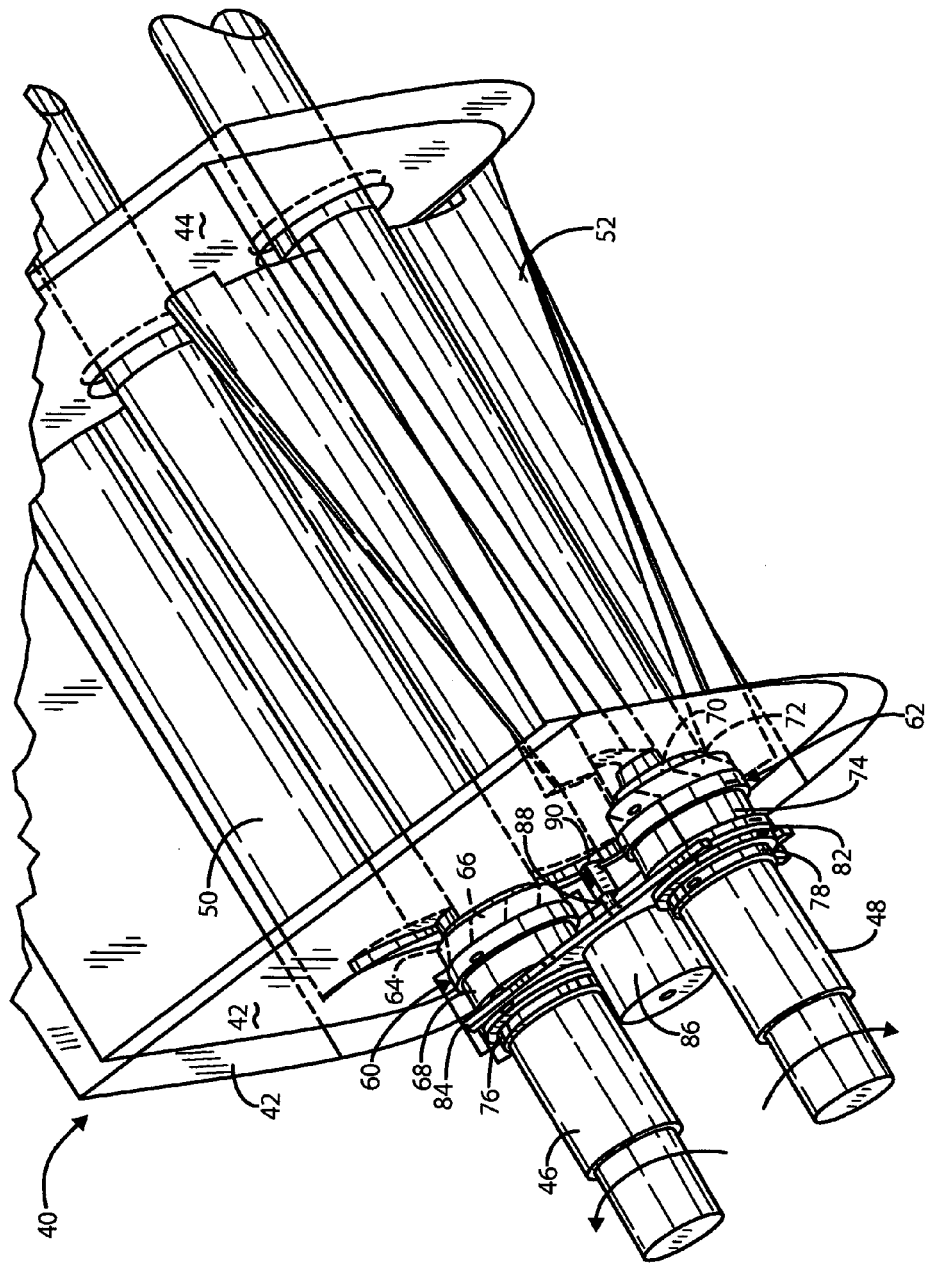
FIG. 2 is an enlarged partially transparent perspective view of a mixing system including a retractable shaft sealing gland system in accordance with one preferred embodiment of the invention.

FIG. 2 is an enlarged partially transparent view of a mixing system suitable for mixing propellant materials or other viscous ingredients that may be flammable and hazardous. The system includes a mixing vessel or bowl, generally at 40, which is represented as being transparent so that internal parts are totally exposed. The vessel 40 includes spaced end plates 42, 44 having bore openings therethrough to accommodate a pair of spaced, generally parallel mixing shafts 46, 48, each carrying mixing blades fixed thereto as at 50, 52, respectively. The shafts are supported from and journaled in a heavy metal bearing plate 54 (FIGS. 3a and 3b) and are designed to rotate in opposite directions as indicated by the directional arrows to promote mixing. The shafts are driven by hydraulic motors or other well-known conventional devices (not shown).

Figure 4:
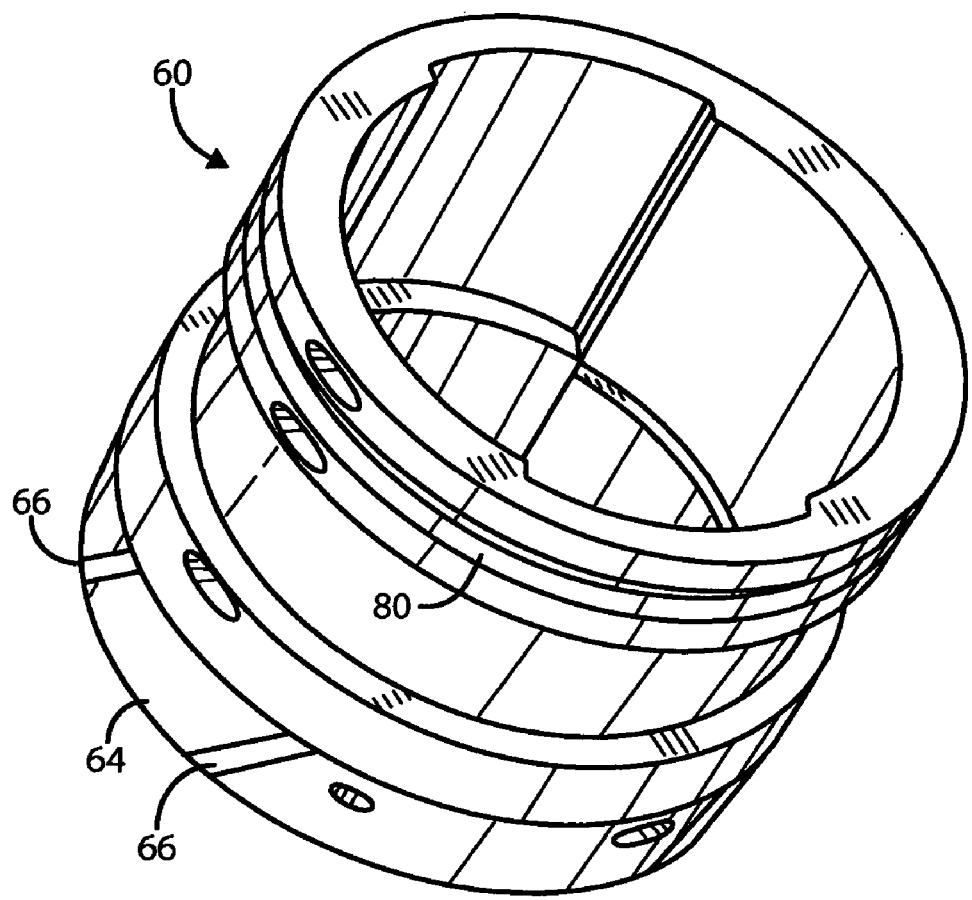
FIG. 4 is a housing-end view of a typical gland assembly (left rotating) in accordance with the invention.
Figure 5:
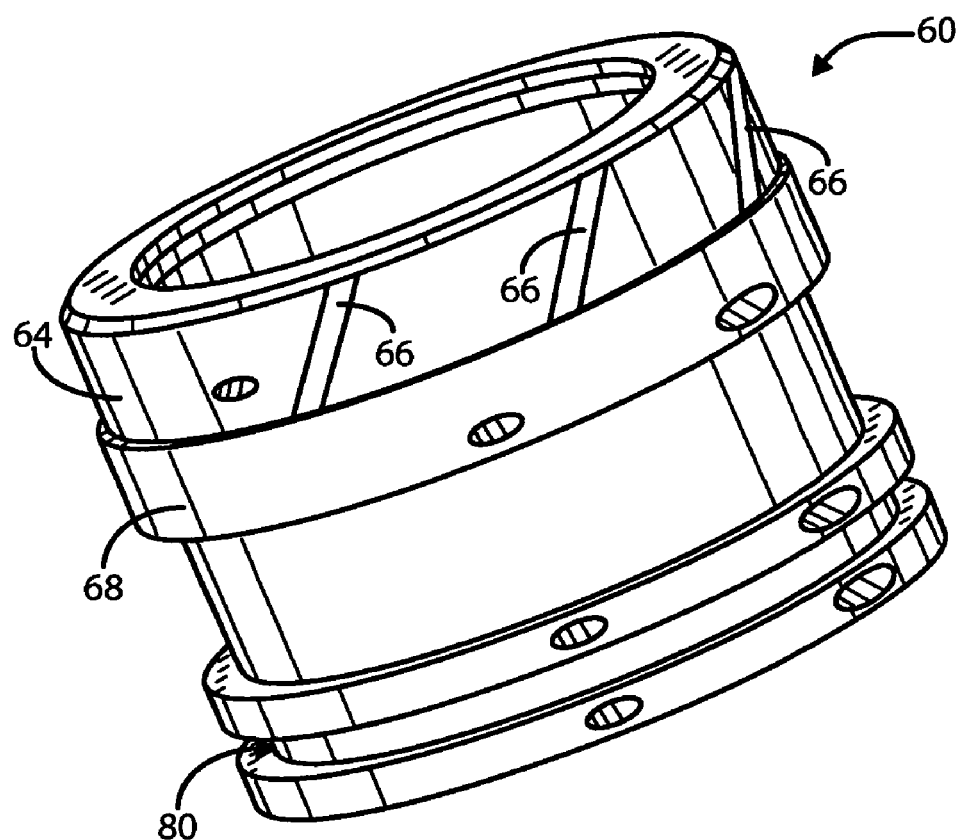
FIG. 5 is a mixer-end view of the gland assembly of FIG. 4.
Figure 6:
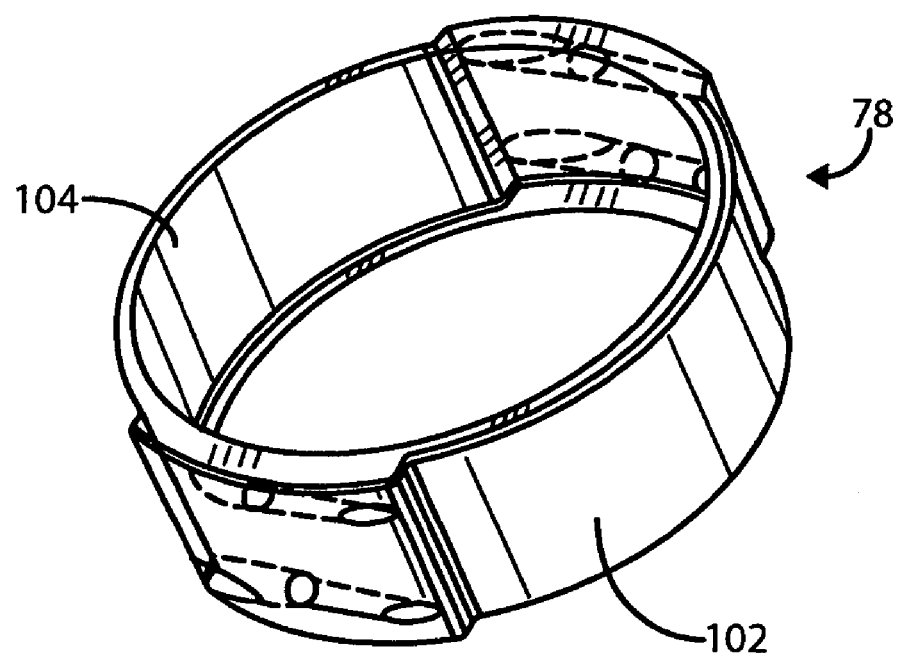
FIG. 6 is a perspective view of a drive clamp that attaches to a mixer shaft.

The shaft sealing gland system includes a pair of gland assemblies 60, 62 associated with respective shafts 46, 48 and designed to rotate with the shafts during mixing. Sealing gland assembly 60 (see also FIGS. 4 and 5) further includes a gland 64 which is provided with a plurality of raised angled radially distributed wiper strips 66 spaced about the circumference of the gland and a housing sleeve 68. The oblique angle of the wiper strips 66 is designed to coordinate with the direction of shaft rotation to direct material to exit at the gland/bore opening interface back into the mixing vessel. Thus, the left hand rotating shaft 46 has a gland 64 with left hand wiper strips. Conversely, gland assembly 62 includes gland 70 with a right hand wipe strip 72 and housing sleeve 74. The gland assemblies 60, 62 are maintained in place during mixing by respective shaft drive clamps 76, 78, one of which is shown in FIG. 6. The clamps include dove-tailing halves 102 and 104 which, when assembled, present an internal surface which prevents relative rotation of the gland assemblies, but which allows axial telescoping of the gland assemblies during the retraction and deployment operations.

The glands 64, 70 may be fixed to their corresponding housing sleeves 68, 74 as by bolts 96, however, parts are preferably dovetailed so that they become an integral unit when assembled. In this regard, it should be noted that the parts of the gland assemblies 60, 62 including the glands and the housing members are preferably made in two halves which are bolted together using external recessed threaded connectors to form the gland systems surrounding each shaft. Of course, the gland assemblies 60, 62 designed to rotate with the shafts 46, 48 also rotate with respect to the engaging pusher plate 84 so that the pusher plate/groove interface is provided with bearing surfaces as at 98 which may be polytetrafluoroethylene or other non-metallic lubricious material.

The glands 64, 70 may be fixed to their corresponding housing sleeves 68, 74 as by bolts 96, however, parts are preferably dovetailed so that they become an integral unit when assembled. In this regard, it should be noted that the parts of the gland assemblies 60, 62 including the glands and the housing members are preferably made in two halves which are bolted together using external recessed threaded connectors to form the gland systems surrounding each shaft. Of course, the gland assemblies 60, 62 designed to rotate with the shafts 46, 48 also rotate with respect to the engaging pusher plate 50 so that the pusher plate/groove interface is provided with bearing surfaces as at 98 which may be polytetrafluoroethylene or other non-metallic lubricious material.

Figure 3A:
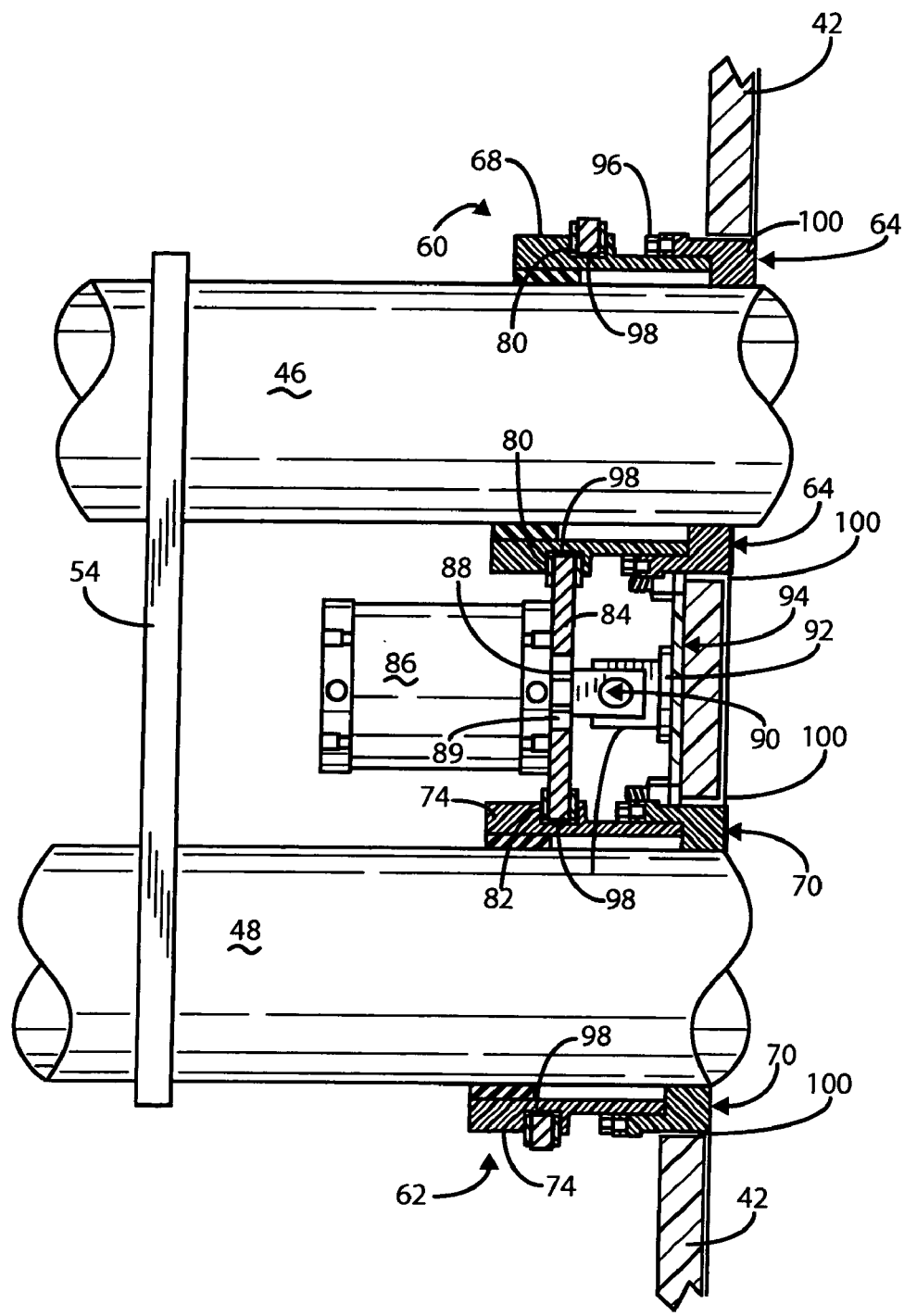
FIG. 3a is a fragmentary schematic top view, partially in section showing details of the shaft sealing gland system of FIG. 2 in the fully deployed or sealing position.
Figure 3B:
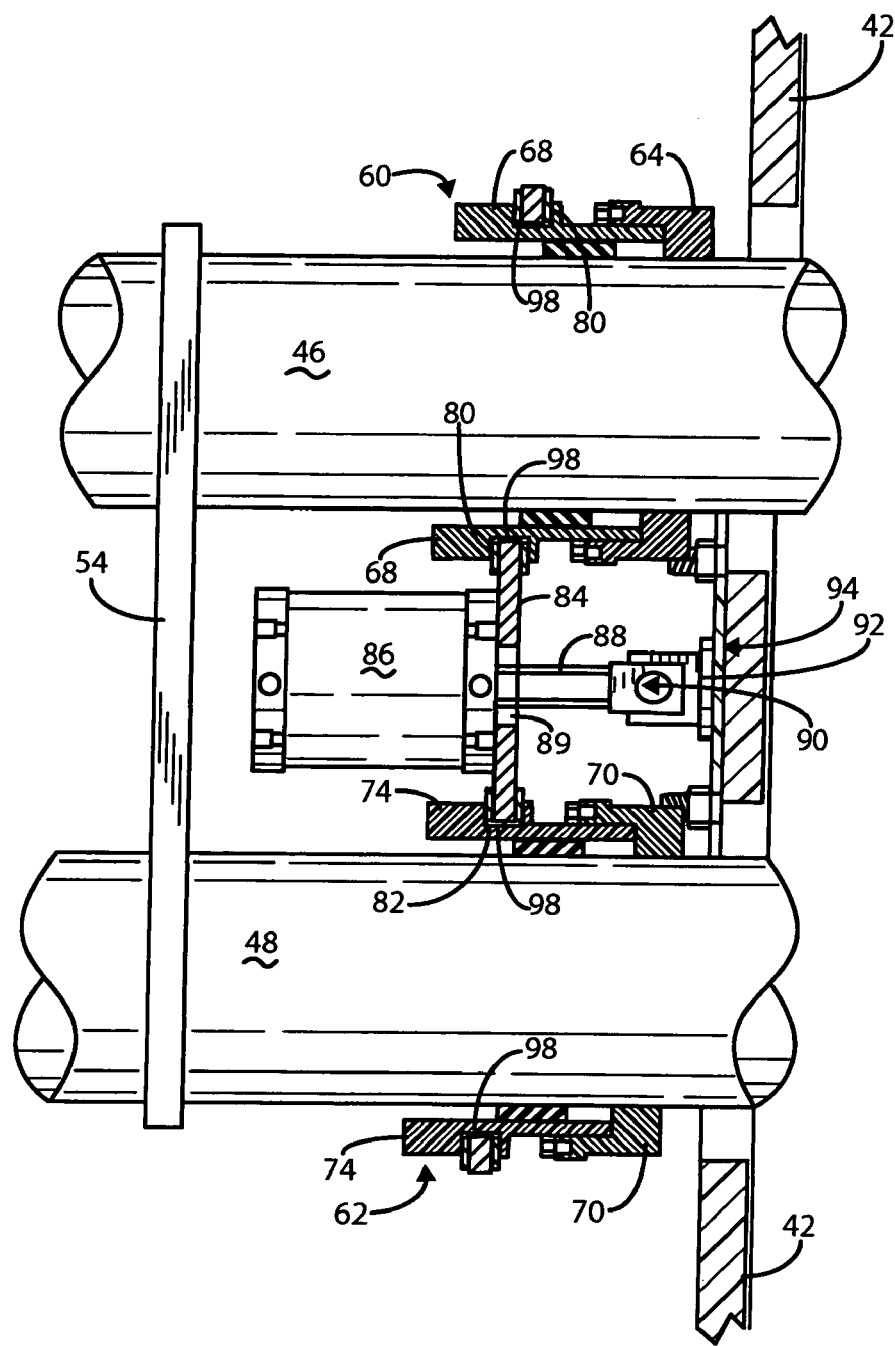
FIG. 3b is a view similar to that of FIG. 3a depicting the shaft sealing gland system in the retracted or cleaning position.

FIGS. 3a and 3b depict fragmentary schematic top views of a mixing system partially in section showing the gland sealing system of the invention in a fully forward or deployed position with respect to the mixer end plate 42 (FIG. 3a) and in a retracted maintenance position in FIG. 3b. In FIG. 3a, note that the small gaps 100 between the mixer shaft sealing gland systems and the mixer end plate bores occur opposite the sealing glands. At this point the wipers of the sealing glands act to push material seeking to escape through the openings 100 back into the mixing vessel. In this regard, the action of the mixing blades pulls the material being mixed away from the openings in the far end wall 44 toward the end wall 42 which creates the material loss problem. FIG. 3b shows the assembly of FIG. 3a in the retracted or cleanout position where the gland assemblies including the glands and wipers can be more easily cleaned and serviced between batches.

In operation, if we assume that the mixing vessel has been charged with viscous ingredients and solvents to be mixed, double-acting cylinder 86 is then moved to the fully retracted position causing the yoke or pusher plate 84 to move toward the mixer end plate 42 moving the gland assemblies 60, 62 into a sealing position relative to the mixer end plate 42 deploying the system for the mixing operation. During mixing, the shafts are oppositely rotated typically from about 20 RPM to about 40 RPM in opposed directions to mix the material. The tendency for material urged toward the wall 42 to escape through the openings 100 is offset by the opposed angle of the rotating wipers in each case. While this does not prevent the escape of any material, it greatly reduces particularly the amount of solvents lost during mixing and, thereby, increases reliability of batch-to-batch composition consistency.

After a batch has finished mixing, which takes typically from about 3 to about 6 hours, the mixing blades are stopped and the cylinder 86 is operated to extend the piston rod 88 causing the clevis bracket 92 to push against the clevis bracket mounting plate 94 thereby causing the pusher plate to move away from the mixer end plate and the sealing gland systems to also move outward away from the bores in the mixer end plate where they can readily be inspected, cleaned and otherwise readied for the next batch to be mixed in an expedient manner.

It should be noted that in this manner, the sealing of the mixing shafts can be automated and cleaning facilitated to both reduce down time between mixed batches, but also reduce hazards associated with mixing propellant materials.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A shaft sealing arrangement for sealing bores around stirrer shafts of interest that emerge through walls of associated mixing vessels comprising:
   (a) a pair of generally cylindrical shaft sealing assemblies designed to be associated with a pair of adjacent spaced generally parallel stirrer shafts of interest, each said shaft sealing assembly includes a gland member and a gland housing, said gland member having an outside surface and an axis and including a plurality of raised spaced radially distributed wiper strips attached to said outside surface, said wiper strips being directionally deployed at an angle with the direction of the axis of said gland such that the wiper strips act to return escaping material back into an associated mixing vessel when said gland is rotated in a desired direction;
   (b) wherein in each said gland assembly is adapted to be mounted on to rotate with a corresponding one of said pair of stirrer shafts of interest and is enabled to move axially relative thereto; and
   (c) a seal drive system for operating said pair of gland assemblies along said pair of shafts of interest between a deployed position wherein each said sealing gland is positioned in a bore through which a corresponding stirrer shaft emerges and in a retracted position wherein said gland assembly is withdrawn outside said bore.

2. A shaft sealing arrangement as in claim 1 further comprising a clamp device associated with each said gland assembly adapted to clamp onto a corresponding stirring shaft and cooperate with said gland assembly, said clamp device allowing movement of said gland assembly along said shaft but preventing relative rotation between said gland assembly and said shaft.

3. A shaft sealing arrangement as in claim 2 wherein said drive system comprises a linear actuator which operates both said gland assemblies by means of a common bridging member.

4. A shaft sealing arrangement as in claim 3 wherein said common bridging member is a pusher plate disposed to interlock with and reciprocate both of said pair of gland assemblies.

5. A shaft sealing arrangement as in claim 3 wherein said linear actuator is a double-acting fluid-operated cylinder fixed to said common bridging member and having an associated reciprocating rod adapted to be fixed to a wall of a vessel through which said stirrer shafts of interest emerge in a manner such that extension and retraction of said cylinder rod moves said common bridging member away from and toward said wall thereby respectively retracting and deploying said gland assemblies.

6. A shaft sealing arrangement as in claim 5 wherein said fluid-operated cylinder is an air cylinder.

7. A shaft sealing arrangement as in claim 2 wherein said gland members and said gland housings are assembled from symmetrical halves, with said gland member being captured by said housing in a dovetail arrangement.

8. A shaft sealing arrangement as in claim 1 wherein said drive system comprises a linear actuator which operates both said gland assemblies by means of a common bridging member.

9. A shaft sealing arrangement as in claim 8 wherein said common bridging member is a pusher plate disposed to interlock with and reciprocate both of said pair of gland assemblies.

10. A shaft sealing arrangement as in claim 8 wherein said linear actuator is a double-acting fluid-operated cylinder fixed to said common bridging member and having an associated reciprocating rod adapted to be fixed to a wall of a vessel through which said stirrer shafts of interest emerge in a manner such that extension and retraction of said cylinder rod moves said common bridging member away from and toward said wall thereby respectively retracting and deploying said gland assemblies.

11. A shaft sealing arrangement as in claim 10 wherein said fluidoperated cylinder is an air cylinder.

12. A shaft sealing arrangement as in claim 1 wherein said gland members and said gland housings are assembled from symmetrical halves, with said gland member being captured by said housing in a dovetail arrangement.

* * * * *